Nov. 10, 1970     L. T. AKELEY     3,538,771
TEMPERATURE INDICATION CIRCUITRY UTILIZING A THERMISTOR SENSOR
AND A RATIOMETER INDICATOR
Filed July 22, 1968

INVENTOR
LLOYD T. AKELEY

BY

ATTORNEY

United States Patent Office 3,538,771
Patented Nov. 10, 1970

3,538,771
TEMPERATURE INDICATION CIRCUITRY UTILIZING A THERMISTOR SENSOR AND A RATIOMETER INDICATOR
Lloyd T. Akeley, Charlestown, N.H., assignor to Simmonds Precision Products, Inc., Tarrytown, N.Y., a corporation of New York
Filed July 22, 1968, Ser. No. 746,547
Int. Cl. G01k 7/24
U.S. Cl. 73—362                     4 Claims

ABSTRACT OF THE DISCLOSURE

A temperature indication circuit employing a voltage divider network having a thermistor probe in one branch thereof and the output of which is connected to a pair of complementary transistors connected in an emitter-follower configuration with a pair of coils of a ratiometer. The rotor-pointer position of the ratiometer varies with the current ratio in the coils and hence with the resistance across the thermistor probe.

---

This invention relates to temperature indication circuitry employing a thermistor probe and more particularly to such circuitry which utilizes a ratiometer having an output which varies as a function of the ratio of currents through the respective coils of the ratiometer, this ratio varying with the resistance of the temperature-responsive thermistor probe.

In order to operate a ratiometer indicator, sufficient power is required to provide the necessary torque to the ratiometer rotor and if the power supplied falls below the required level, excess friction error and low torque to inertia will result. Attempts have been made to operate the ratiometer indicator from a thermistor bridge circuit for the purposes of giving temperature indication within a given range, but this method has been found to be ineffective for supplying adequate power to the ratiometer coils. Accordingly, it is the purpose of this invention to overcome the aforementioned difficulties and provide a circuit for temperature measurement in a 120° F.–320° F. range, such as would be required for measuring the temperature of coolant and oil in internal combustion engines and the like.

It is an object of this invention to provide a temperature indication circuit utilizing a pair of ratiometer coils and a thermistor probe in which the load from the ratiometer is effectively removed from the thermistor probe circuit resulting, therefore, in a high torque indication without loading the thermistor and eliminating self-heating effects in the thermistor probe.

It is another object of this invention to provide a temperature indication circuit for coolant and oil in internal combustion engines in which the output of a ratiometer indicator is made responsive to the output of a thermistor probe and the coils of the ratiometer are excited by a transistor circuit for supplying sufficient power to obtain effective torque levels.

It is yet another object of this invention to provide a temperature indicator circuit employing a transistor powered ratiometer and a thermistor probe voltage divider circuit in which high torque indication is achieved without loading the thermistor and in which changes in gain of the transistor-ratiometer circuit are effectively cancelled.

According to one aspect utilizing the principles of this invention, there is provided a circuit with a two coil ratiometer excited by two transistors in emitter-follower configuration and a voltage divider circuit including a thermistor probe. The transistors drive their ratiometer coils so that the voltage divider network need only supply the low base currents instead of the much higher coil currents. Each of the currents in the coils of the ratiometer changes with respect to one another and the ratiometer-rotor pointer position is a function of the ratio of these two currents and hence the pointer position varies with the resistance of the thermistor which, in turn, varies with the temperature being measured.

Other objects and advantages will become apparent from a detailed study of the following specification and drawings, in which.

Figure 1:
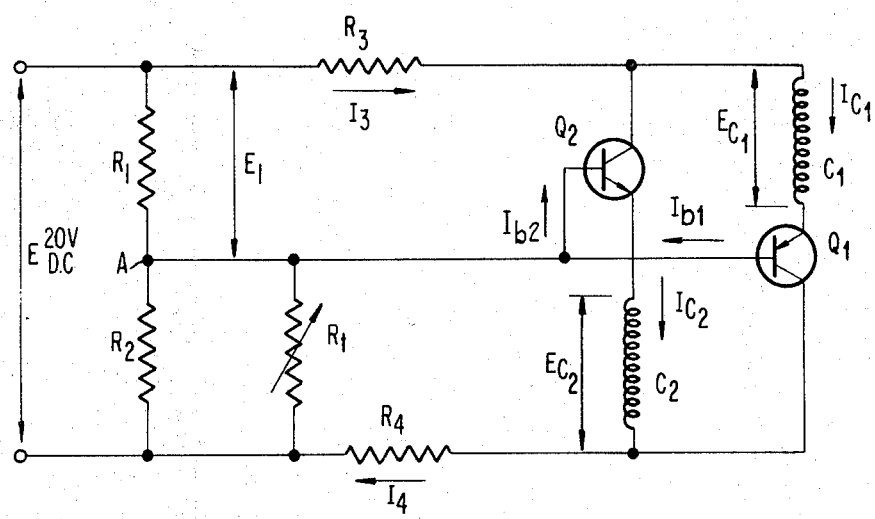
FIG. 1 is a circuit diagram illustrating the principles of this invention.

Referring now to FIG. 1, there is shown a 20 volt D.C. supply E to a thermistor voltage divider network comprising a first branch formed by resistance $R_1$ and a second branch formed by resistance $R_2$ with the thermistor $R_t$ shunted by a fixed resistance $R_2$ to give a desired temperature coefficient and hence greater linearity output to the total output resistance $R_p$ where:

(1) $$R_p = \frac{R_2 R_t}{R_2 + R_t}$$

($R_2$ = a constant)

With fixed E and constant $R_1$:

(2) $$\frac{E_1}{E} = \frac{R_1}{R_1 + R_p}$$

Assuming over the desired range of operation that $R_p$ goes from $R_p$ minimum to $R_p$ maximum, the node point A swings equally each side of center if:

(3) $$R_1 = \sqrt{R_p \text{ min.} \times R_p \text{ max.}}$$

As shown in FIG. 1, transistors $Q_1$ and $Q_2$ have their bases connected in common to junction point A on the voltage divider network and are further connected to drive two ratiometer coils $C_1$ and $C_2$, respectively. In this manner the voltage divider network need only supply the low base currents of the transistors $Q_1$ and $Q_2$ instead of supplying the higher currents required by the coils $C_1$, $C_2$. A pair of span-adjusting resistors $R_3$ and $R_4$ are provided, as shown.

Thus, assuming the base currents of $Q_1$ and $Q_2$ are equal, then:

(4) $$I_3 = I_4 = I_{c1} + I_{c2}$$

(5) $$E_{c1} = E_1 - 0.5 - I_3 R_3$$

and (6) $$E_{c2} = E - E_1 - 0.5 - I_4 R_4$$

It will be seen that the transistor base currents $I_{b1}$ and $I_{b2}$ flow in opposite directions thus minimizing loading of the voltage divider. Further, transistor gain change with temperature effects will tend to cancel since both coil currents $I_{c1}$ and $I_{c2}$ increase together and decrease together with temperature change.

The coil voltages $E_{c1}$, $E_{c2}$ can be calculated for the FIG. 1 circuit to allow calculating the ratiometer rotor-pointer position with temperature change. Thus, as $I_{c1}$ increases, $I_{c2}$ decreases, and since the ratiometer rotor-pointer position is a function of the ratio of $I_{c1}/I_{c2}$, the pointer position will vary with $R_t$ when the latter varies with temperature. It is important, also, that the thermistor wattage be minimized in order to reduce self-heating effects.

Figure 2:
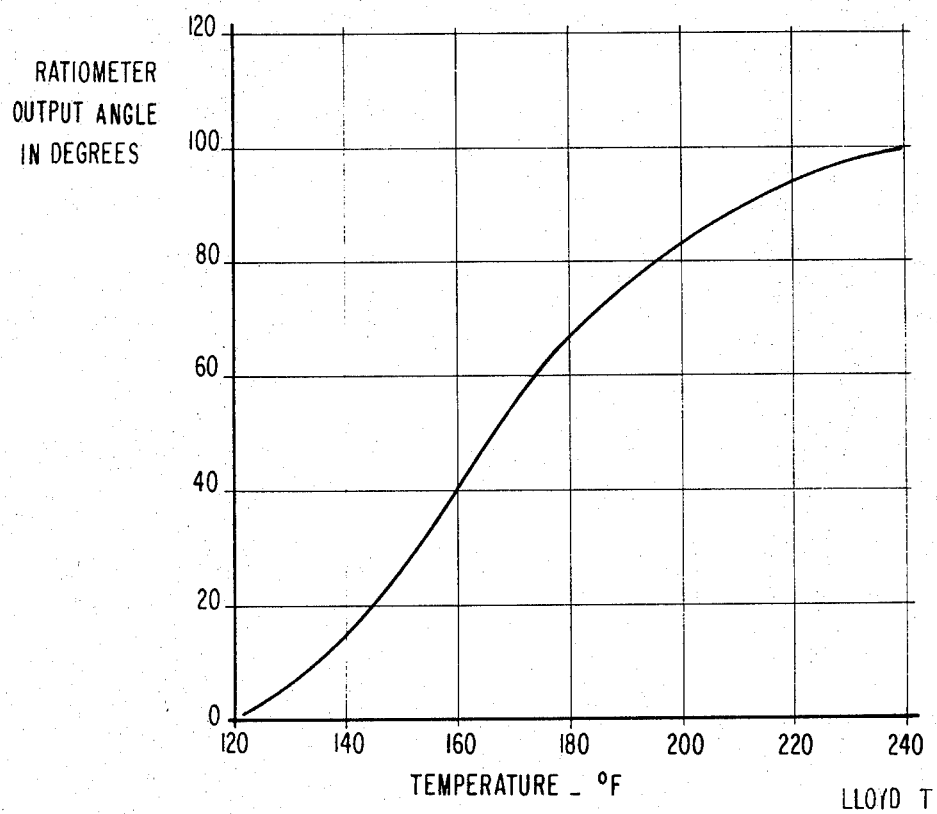
FIG. 2 is a graph illustrating temperature versus ratiometer indicator output in degrees.

FIG. 2 shows a ratiometer pointer output angle versus thermistor temperature for the circuit configuration of FIG. 1 employing a two coil ratiometer element with two 300-ohm coils 120 mechanical degrees apart.

What is claimed is:

1. A circuit for indicating temperature change comprising a voltage divider network, means for connecting said voltage divider network across a voltage source, said voltage divider network including a first and a second serially connected impedance branch, a thermistor probe connected in one of said branches, a ratiometer having a pair of coils and a rotor-pointer output, said coils being operatively connected respectively to a pair of transistors, the bases of said transistors being connected in common to the junction point of said first and second branches, such that the base currents of said transistors flow in opposite directions with respect to each other, whereby the ratio of current through said coils varies with the change in resistance across the thermistor probe.

2. A circuit for indicating temperature change as set forth in claim 1, wherein said transistors are complementary and each has its associated coil connected in its emitter circuit whereby the ratio of current in said coils varies with the change in resistance across the probe.

3. A circuit for indicating temperature change as set forth in claim 2, wherein said first and said second branches each includes a resistive element, the resistive element of said second branch being connected in parallel with said thermistor probe.

4. A circuit for indicating temperature change comprising a voltage divider network including a first and a second branch having an intermediate junction point, means for connecting said voltage divider network across a voltage source, a thermistor probe connected in one of said branches, a pair of transistors, one of said transistors being an NPN type, the other of said transistors being a complementary PNP type, each transistor having its base connected in common to the junction point of said voltage divider network such that the base currents of said transistors flow in opposite directions with respect to each other, a ratiometer having a pair of coils and a rotor-pointer output, the emitter of said NPN transistor being connected to one of said coils and the emitter of said PNP transistor being connected to the other of said coils, a pair of resistors connected between said voltage divider network and the collectors of said transistors respectively, whereby the ratio of current through said coils varies with the change in resistance across said thermistor probe.

References Cited
UNITED STATES PATENTS

| | | | |
|---|---|---|---|
| 2,399,903 | 5/1946 | Anderson | 73—362 |
| 3,348,415 | 10/1967 | Ash | 73—362 |

LOUIS R. PRINCE, Primary Examiner

D. E. CORR, Assistant Examiner